US010737616B1

(12) United States Patent
Kreager

(10) Patent No.: US 10,737,616 B1
(45) Date of Patent: Aug. 11, 2020

(54) SAFETY AND ALERT SYSTEM FOR A CHILD SEAT OF A VEHICLE

(71) Applicant: Daryl Kreager, Port Charlotte, FL (US)

(72) Inventor: Daryl Kreager, Port Charlotte, FL (US)

( * ) Notice: Subject to any disclaimer, the term of this patent is extended or adjusted under 35 U.S.C. 154(b) by 0 days.

(21) Appl. No.: 16/381,159

(22) Filed: Apr. 11, 2019

(51) Int. Cl.
*G08B 21/00* (2006.01)
*B60Q 9/00* (2006.01)
*B60N 2/90* (2018.01)
*B60N 2/00* (2006.01)
*B60N 2/26* (2006.01)

(52) U.S. Cl.
CPC .............. *B60Q 9/00* (2013.01); *B60N 2/002* (2013.01); *B60N 2/26* (2013.01); *B60N 2/90* (2018.02)

(58) Field of Classification Search
CPC . B60Q 9/00; B60N 2/90; B60N 2/002; B60N 2/26
USPC ........................................ 340/457
See application file for complete search history.

(56) References Cited

U.S. PATENT DOCUMENTS

| | | | |
|---|---|---|---|
| 7,170,401 B1 * | 1/2007 | Cole ..................... | B60N 2/002 340/439 |
| 9,384,647 B1 * | 7/2016 | Arnold .................. | G08B 21/02 |
| 2005/0200465 A1 | 9/2005 | Fabors | |
| 2015/0077237 A1 * | 3/2015 | Chou ..................... | G06F 3/0483 340/439 |
| 2018/0130327 A1 * | 5/2018 | Rogers ................. | G08B 21/028 |
| 2018/0354443 A1 * | 12/2018 | Ebrahimi .............. | B60R 22/105 |

* cited by examiner

*Primary Examiner* — Mark S Rushing
(74) *Attorney, Agent, or Firm* — Sanchelima & Associates, P.A.; Christian Sanchelima; Jesus Sanchelima

(57) ABSTRACT

The present invention is a safety and alert system installed in a child seat of a vehicle. The system has at least one weight detector to detect the presence of a child on a child seat. Temperature sensors and a heart monitor will be activated when the presence of a child is detected. A processing unit processes signals received from one of the sensors or a GPS tracker unit, when the body temperature of a child and the inside temperature of a vehicle are not within a preset safe range and/or when the child is unattended for a period of time more than the preset time limit. These signals are then sent to the alerting unit to allow proper action to be taken. A GPS tracker unit tracks the current location of the vehicle and sends location information to the proper authorities. The alerting unit sends sound messages, text messages or electronic emails to a user. At least one tint sticker and LED light are installed on a vehicle window to indicate and alert people outside of the vehicle, by turning ON LED lights, that a child has been left unattended in a vehicle or that there is an emergency involving a child inside of a vehicle.

14 Claims, 3 Drawing Sheets

SAFETY AND ALERT SYSTEM FOR A CHILD SEAT OF A VEHICLE

BACKGROUND OF THE INVENTION

1. Field of the Invention

The present disclosure relates to a safety and alert system. More particularly, the present disclosure relates to a child seat in a vehicle installed with multiple safety and alert systems to alert parents, caregivers and authorities, when a child is left unattended in vehicle and in the case of emergency.

2. Description of the Related Art

Several deaths are happening nowadays because of children being left unattended in vehicles for long periods of time. Many safety and alert systems are used to safeguard children in unattended vehicles, by alerting parents or caregivers.

Applicant believes that a related reference corresponds to European patent application EP3154037A1 filed by CRYSTAL CARLSON for a child car seat alarm system. The CRYSTAL reference discloses a child car seat alarm system for informing a child left unattended in a locked vehicle. The system includes a weight detection sensor, wherein said weight detection sensor activates when a child is positioned in a child safety seat; a power source for operating said child car seat alarm system; a wireless alert unit, wherein said unit connected through said system via Bluetooth technology.

Another related application is U.S. Pat. No. 7,170,401B1 filed by Cole Charles J for a system to detect the presence of an unattended child in a vehicle. The Cole reference discloses a system which detects the presence of an unattended child within a vehicle and when the child is so detected, disables the vehicle's door locks by preventing doors from being locked or remaining locked and sounds an alarm. The presence of a child is detected by measuring pressure on the back seat and measurements above a threshold limit signify a child is present or if any of the rear seat belts are buckled. The system can be shut off by the driver, although the system has an override in the shutoff mode so that if the temperature rises above or falls below a certain level and the presence of a child is detected, the alarm is sounded. In this mode, the presence of the child can also be detected by a motion sensor.

Another related application is U.S. Pat. No. US20050200465A1 filed by Fabors Shawn O, et al for a child seat occupancy alarm system for automobiles. The Fabors, et al reference discloses an alarm system for detecting the presence of a child being left unattended in a car seat inside a parked vehicle. The alarm includes a weight sensor and temperature monitoring device. The weight of the child activates the unit, which then begins monitoring the interior temperature of the vehicle. Should both the car seat be occupied and the interior temperature reach pre-determined danger levels, an alarm will be triggered.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a child seat for a vehicle installed with multiple safety and alert systems to alert parents, caregivers and authorities, when a child is left unattended in vehicle and in the case of emergency.

It is yet another object of the present invention to provide a safety and alert system installed in a child seat. The system has at least one weight detector to detect the presence of a child on the child seat. A temperature sensor and heart monitor will be activated, when presence of a child is detected. A processing unit process signal from at least one sensor and generate alert signal to GPS tracker unit and alerting unit, when the body temperature of a child and the inside temperature of vehicle are not at the preset safe range and/or when the child is unattended for a period more than the pre-set time limit. A GPS tracker unit track current location of the vehicle and send location information to authority. The alert unit sends sound/text message or electronic email to user. At least one tint sticker and LED light are installed on vehicle window to indicate and alert outside people of the situation in the vehicle by turning ON LED lights.

It is still another object of the present invention to provide a safety and alert system installed in a child seat of a vehicle comprising temperature sensor installed in three sides of a head rest of child seat to detect body temperature of child and the inside temperature of a vehicle. The temperature sensor is activated when the presence of a child on child seat is detected by a weight sensor. The heart monitor can be used to sense and monitor the heartbeat of the child, when the presence of a child on child seat is detected by weight sensor. Based on the detected sensor information, when the child is unattended for a long period of time, an alert signal is sent to the user, parents, guardians or authorities.

It is another object of the present invention to provide a safety and alert system installed in a child seat of a vehicle comprising a proximity sensor installed in vehicle to detect the distance of a user, parents or guardians from the vehicle. This information can be used to release seat lock at the time of activation of alert and safety system.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
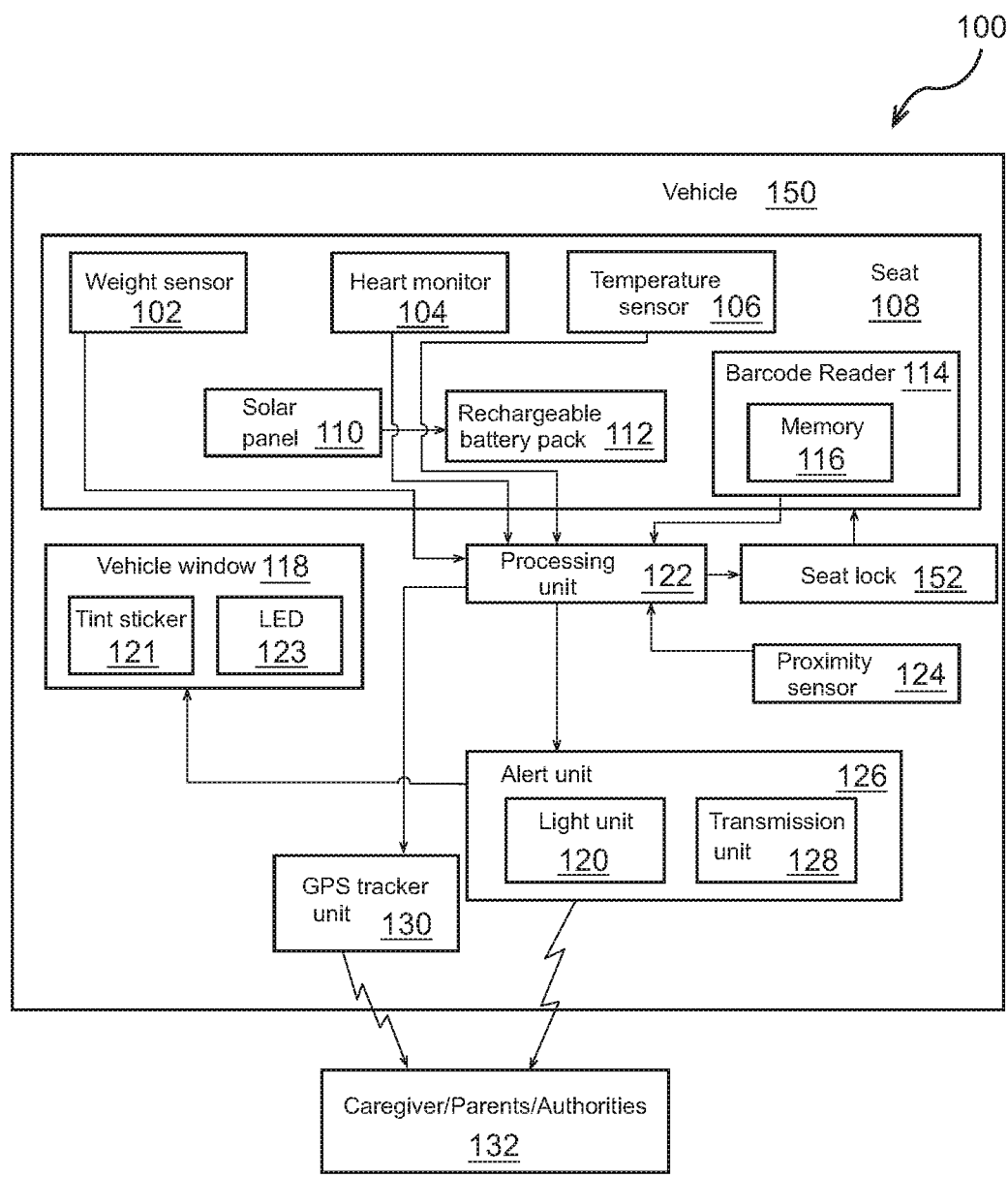
FIG. 1 represents a block diagram of a child safety and alert system 100 installed in a child seat 108 of vehicle 150. The system 100 detects the presence of an unattended child in the child seat 108 and alerts parents, caregivers and authorities 132. The system 100 has a weight sensor 102, a heart monitor 104 and a temperature sensor 106 to detect conditions of the child in the vehicle 150 and accordingly alert parents, caregivers and authorities.

Referring now to the drawings, FIGS. 1-4, where the present invention is generally referred to with numeral 100, it can be observed that a safety and alert system installed on child seat 108 of a vehicle 150, in accordance with one embodiment, is provided that one or more sensors to alert user or authority 132, when body temperature of child and inside temperature of vehicle are not at preset safe range and/or when child is unattended for a period more than preset time limit.

FIG. 1 represents a block diagram of a child safety and alert system 100 installed in a child seat 108 of a vehicle 150. The child safety and alert system 100 has at least one sensor installed in a child seat 108. The sensors can be, but not limited to, a weight sensor 102, temperature sensors 106 and heart monitor 104. The weight sensor 102 is used to sense the presence of a child on child seat 108. The temperature sensors 106 are installed into three sides of a head rest of child seat 108 to detect the body temperature of a child and the inside temperature of vehicle 150. The temperature sensors 106 are activated when the presence of a child on child seat 108 is detected by weight sensor 102. Heart monitor 104 can be used to sense and monitor the heartbeat of a child, when the presence of a child on child seat 108 is detected by weight sensor 102.

At least one proximity sensor 124 is installed in vehicle 150 to detect the distance of a user 132 from vehicle 150. This information can be used to release the seat lock 152 at the time of activation of child safety and alert system 100. The release of seat lock 152 will only happen when user 132 is at a preset distance, for example, fifteen feet away from the vehicle 150. The user 132 can be caregivers, parents or authorities, to whom the state of unattended child is conveyed immediately, in case of emergency, so that immediate action can be taken to save the child.

The child safety and alert system 100 has at least one GPS tracker unit 130 to track the current location of vehicle 150. The location information is sent to authorities, when body temperature of child and inside temperature of vehicle 150 are not at preset safe range and/or when child is unattended for a period more than that of a preset time limit.

At least one alert unit 126 is used to alert user 132, when the body temperature of a child and the inside temperature of vehicle 150 are not at a preset safe range and/or when a child is unattended for a period more than that of a preset time limit. The alert unit 126 has at least one transmission unit 128 and at least one light unit 120. Transmission unit 128 transmits alert signal to user 132. Light unit 120 is used to indicate and alert outside people of vehicle 150. The vehicle window 118 is installed with tint sticker 121 and Light Emitting Diodes (LED) 123. Light unit 120 sends signal to LED 123, which is turned ON, to alert and indicate to those outside of the vehicle 150, in case of emergency or in case when the child is unattended for a period more than that of preset time limit. Such indication will help people outside vehicle 150 to easily identify vehicle 150 in which child is unattended or vehicle that is in emergency, from a group of vehicles.

A processing unit 122 is used to process signal from at least one sensor and generate alert signal to GPS tracker unit 130 and alert unit 126, when body temperature of a child and inside temperature of vehicle are not at preset safe range; and/or when child is unattended for a period more than that of preset time limit.

The child safety and alert system 100 further comprises at least one solar panel 110 to power various electronic devices of child safety and alert system 100. The power from solar panel 110 can be used to store for later use using at least one rechargeable battery pack 112. At least one bar code reader 114 and memory 116 are built in the child safety and alert system 100 to register various devices connected in the child safety and alert system 100.

Figure 2:
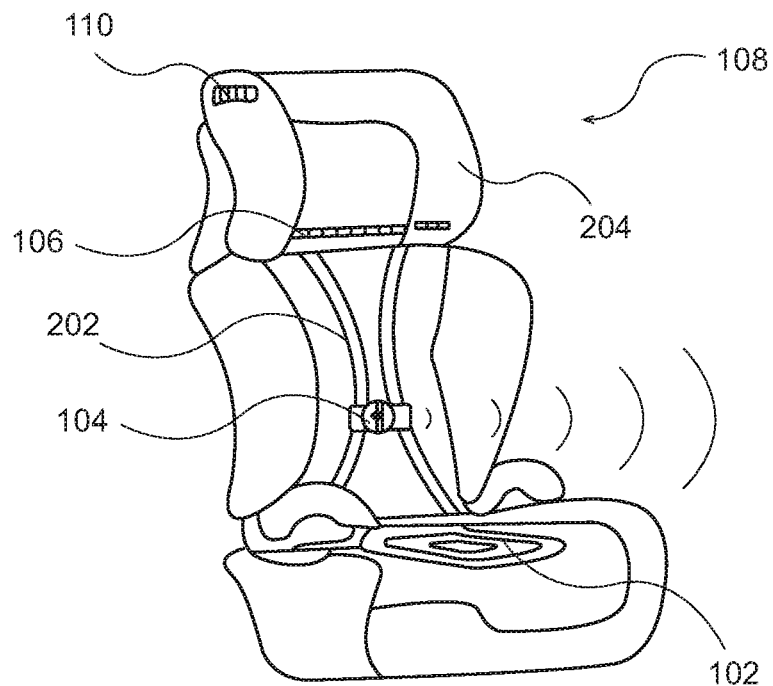
FIG. 2 illustrates an isometric view of the child seat 108 showing weight sensor 102, heart monitor 104 and temperature sensor 106 used to detect the condition of the child in the child seat 108 and accordingly alert parents, caregivers and authorities 132. A solar panel 110 is used to provide power to various electrical and electronics devices in the system 100.

FIG. 2 demonstrates of isometric view of child seat 108 showing weight sensor 102, heart monitor 104 and temperature sensor 106 used to detect conditions of the child in the vehicle 150 and accordingly alert parents, caregivers and authorities 132. A solar panel 110 is used to provide power to various electrical and electronic devices in the child safety and alert system 100. As shown in FIG. 2, heart monitor 104 is installed in child seat 108 using at least one strap 202. The weight sensor 102 is not limited to a weight pad installed on seating portion of the seat. The heart monitor 104 is not limited to a heat rate sensor and is used to closely monitor heart rate of child. The temperature sensors 106 are installed in three sides of a head rest 204 of child seat 108 to detect the body temperature of a child and inside temperature of vehicle 150. The temperature sensors 106 are not limited to temperature strips as installed in child seat 108 of FIG. 2. The temperature sensors 106 and heart monitor 104 are activated when a child is placed on child seat 108, which is detected by weight sensor 102. When the body temperature of a child and the inside temperature of vehicle are not at preset safe range and/or when child is unattended for a period more than preset time limit, alert is sent to user 132, not limited to caregiver and/or parents and authority.

Figure 3:
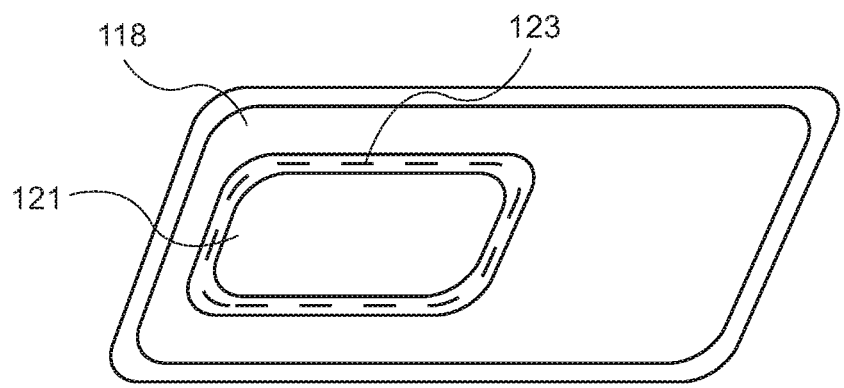
FIG. 3 shows a side view of the vehicle window 118 installed with tint stickers 121 and LEDs 123 to alert and indicate to people outside of the vehicle 150 that a child has been left unattended in the vehicle 150 for a long period of time.

FIG. 3 shows a side view of the vehicle window 118 installed with lighting unit 121 comprising tint stickers 121 and LEDs 123 to alert and indicate people outside the vehicle 150, when the body temperature of a child and inside temperature of vehicle are not at preset safe range and/or when child is unattended for a period more than the pre-set time limit. The safe temperature range of a child and room and maximum time the child can be left unattended in vehicle 150, can be set in the processing unit 122, so that proper alert signals can be generated to alert user 132. The preset safe range temperature can be a clinically acceptable range of body temperature of infants or children.

Figure 4:
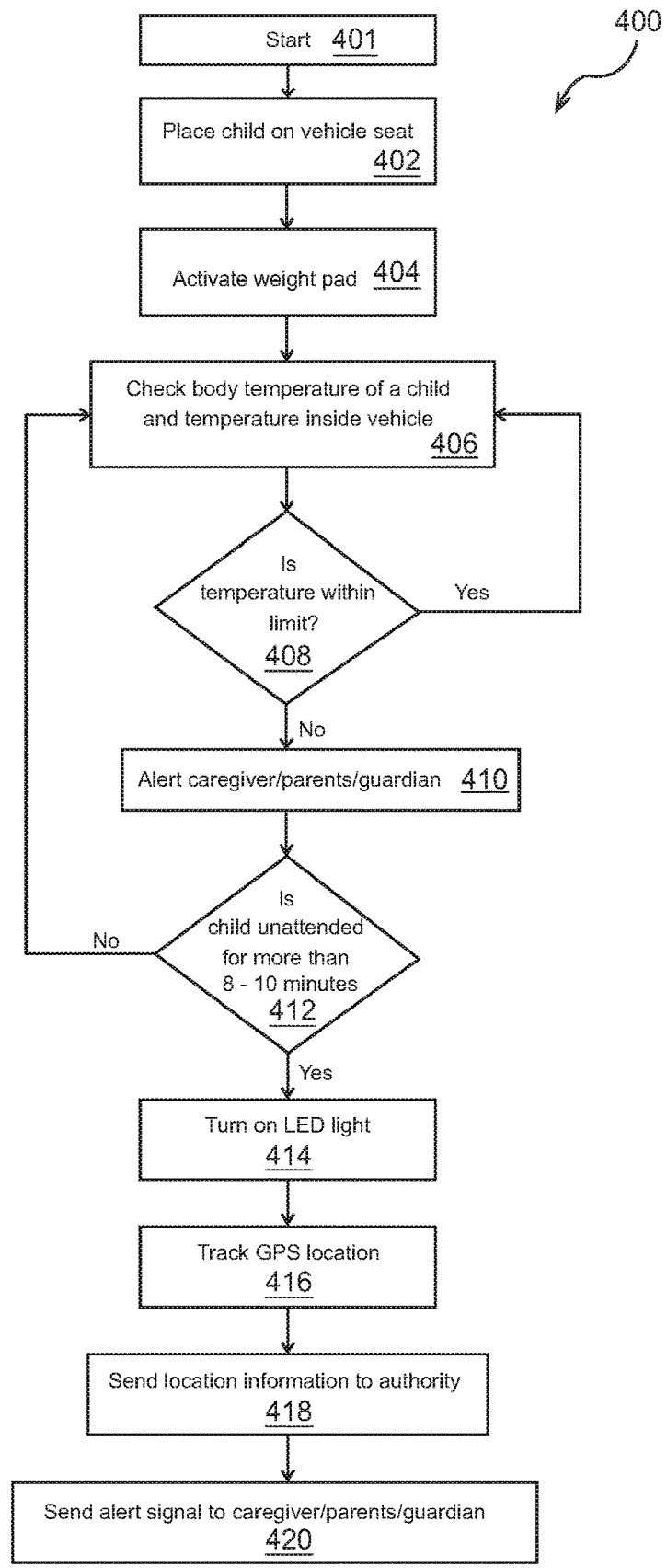
FIG. 4 is a flow chart showing process 400 of the system of FIG. 1 used for child safety and to alert parents, caregivers and authorities 132 when a child is left unattended in vehicle 150 and in the case of emergency

FIG. 4 is a flow chart 400 showing process of system 100 of FIG. 1 used for child safety and alert parents, caregivers and authorities, when a child is left unattended in vehicle 150. As at step 401, the child safety and alert system 100 starts functioning as soon when a child is placed on child seat 108. As at steps 402 and 404, placing child on child seat 108 activates weight sensor 102, which in turn activates all the sensors to detect various parameters of child and other safety devices. The temperature sensors 106 detect body temperature of the child and the inside temperature of vehicle, as at step 406. As in step 408, the body temperature of a child and the inside temperature of vehicle 150 are checked. If the temperature values are more than the preset safe range, an alert signal is sent to the caregiver/parents/ guardians, as at step 410. When a child is unattended for a period more than preset time limit, as at step 410, steps 414, 416, 418 and 420 are performed. As at step 414, the LED 123 on window 118 is turned ON to alert outside people of vehicle. As at step 416 and 418 location information of vehicle is obtained using GPS tracker unit 130 and is send to authority. The alert signal is sent to authority and user 132, at step 420, when a child is unattended for more than preset time.

It should be noted that, the location information is transmitted to authorities in the form of signals, not limited to beacon signal, other suitable signals. The alert signal used and sent to user, caregiver, guardians or authority can be on the form of wireless signal such as audio signal, beep sound, email, text message, telephone call with preset voice message, and so on. Upon receiving the alert signal, the user, caregiver, guardians or authority can act accordingly to safeguard the child in vehicle. Further user, caregiver or guardians can have a mobile or web application, used to receive alert signal and location information of the child in vehicle.

Thus, the present invention provides an efficient solution to safety of children left unattended for more than safe time or in case of emergency situations like car accidents, door dead lock, and so on. The present invention not only alerts parents/guardians but also send location information and alert signal/message to authorities, for example, government authorities used in emergency situation to rescue unattended child in vehicle. The system can be installed in any vehicle where safety and alert are required, for example, car seat without limitation.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A safety and alert system installed in a child seat of a vehicle, comprising:
    at least one sensor installed in said child seat, wherein said at least one sensor is at least one weight sensor adapted to sense the presence of a child on said child seat;
    at least one temperature sensor installed in three sides of a head rest of said child seat adapted to detect the body temperature of said child and the inside temperature of said vehicle, when the presence of the child on said child seat is detected by said at least one weight sensor;
    at least one heart monitor to adapted to sense and monitor heartbeat of the child when the presence of said child on said child seat is detected by said weight sensor;
    at least one proximity sensor installed in said vehicle adapted to detect the distance a user is from said vehicle;
    at least one GPS tracker unit to track the current location of said vehicle;
    at least one alerting unit to alert a user, including at least one transmission unit to transmit an alert signal to said user and to transmit said alert signal and the current location information to authorities;
    at least one light unit used to turn ON lights installed on a vehicle window to indicate and alert people outside of said vehicle that the body temperature of the child and the inside temperature of said vehicle are not at a preset safe range and/or when the child is unattended for a preset length of time; and
    at least one processing unit to process a signal from at least one sensor and to generate said alert signal to GPS tracker unit and said at least one alerting unit when the body temperature of the child and the inside temperature of said vehicle are not at the preset safe range and/or when the child is unattended for the preset length of time, said GPS tracker unit sends the current location information of said vehicle to authorities when said alert signal is received.

2. The safety and alert system of claim 1, further includes at least one solar panel to power various electronic devices of system.

3. The safety and alert system of claim 2, further includes at least one rechargeable battery to store electrical power from said at least one solar panel.

4. The safety and alert system of claim 1, wherein said temperature sensor is a temperature strip.

5. The safety and alert system of claim 1, further includes at least one bar code reader and memory to register various devices used in said safety and alert system.

6. The safety and alert system of claim 1, wherein said child seat and said head rest are designed to snug fit a child.

7. The safety and alert system of claim 1, wherein a weight pad detects the presence of child when the weight of a child is more than one pound, said at least one weight sensor being said weight pad.

8. The safety and alert system of claim 1, wherein the current location information of said vehicle is sent to authorities as a beacon signal.

9. The safety and alert system of claim 1, wherein said alert unit sends an audio signal, text signal or electronic mail to said user.

10. The safety and alert system of claim 9, wherein said audio signal is a beep sound.

11. The safety and alert system of claim 1, wherein said at least one light unit turns on lights upon receiving said alert signal from said processing unit.

12. The safety and alert system of claim 1, wherein the lock on said child seat is released only when said user is at predetermined distance from said vehicle.

13. The safety and alert system of claim 1, wherein a car window is installed with at least one tint sticker and LED light.

14. The safety and alert system of claim 1, wherein said user can access at least one mobile/web application to monitor the signal from said at least one sensor and receive said alert signal from said at least one alerting unit.

* * * * *